Figure 1:
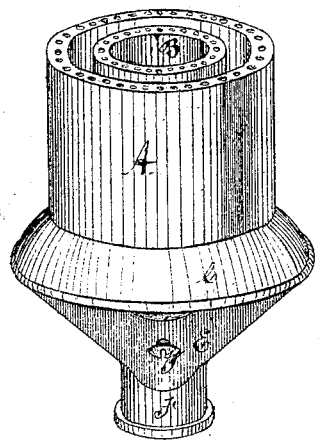

A. E. DUPAS.
Gas Burner.

No. 111,825.  Patented Feb. 14, 1871.

Witnesses—  Inventor—

United States Patent Office.

ANTOINE ERNEST DUPAS, OF NEW ORLEANS, LOUISIANA.

Letters Patent No. 111,825, dated February 14, 1871.

IMPROVEMENT IN GAS-BURNERS.

The Schedule referred to in these Letters Patent and making part of the same.

I, ANTOINE ERNEST DUPAS, of Paris, France, but now residing in the city of New Orleans, Louisiana, have invented a certain Improvement in Gas-Burners, of which the following is a specification.

My invention is an improvement on my gas-burner for which Letters Patent of the United States No. 107,234, and dated September 13, 1870, were granted to me, whereby I obtain a more general and uniform diffusion of the gas produced by the absorption of carbon from the hydrocarbon by the air throughout all parts of the duplicate concentric circles or rings of jets, which are employed in said improvement as patented, and hence a more equal or uniform flow of the gas from each of the jets in said rings or circles, and consequently a more powerful and unvarying illumination therefrom; a perfect control over the inner concentric ring of jets by the regulation of the flow of gas therefrom, and therefore a perfect equalization of every jet one with another, and consequently, further, a light which burns everywhere alike, or, more accurately speaking, a flame everywhere of equal height and density, which my burner as patented does not always produce.

My present improvement is, moreover, better proportioned, and therefore presents a more symmetrical and handsome appearance than my patented burner, and can be produced at considerably less cost.

A reference to the drawing, on which is exhibited a perspective view and a vertical section of my improvement, will at once indicate its nature and its superiority over my patented burner.

A and B are two concentric rings of metal, through which vertically the small perforations $a$ are made, to serve as conduits for the passage of the gas up to the points of combustion at the tops of said rings, where it issues in the ordinary manner in as many jets as there are perforations.

Figure 2:
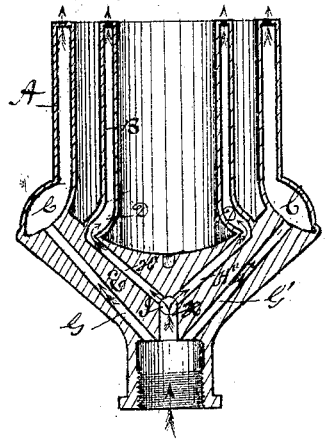

The rings A B may be of solid metal, or they may be composed of two walls each, as shown at Figure 2, with an open space between them, which is closed at top except so far as the perforations are concerned, as shown at both figures, but most clearly at Figure 1.

At the bottom of the rings A B, respectively, are the gas-chambers C D, C being larger than D, and each having a greater diameter than the ring to which it is attached, as shown in the drawing.

The gas-chambers are soldered on the rings, and to a bifurcated short section of pipe E, which, at the extremity of its vertical part F, is provided with a female-screw inside it, for the purpose of connecting it with the service-pipe coming from the carbureter or gas-main, as the case may be.

The gas is supplied to the outer ring A by means of two small passages G G, drilled one in one arm and the other in the other arm, through the bifurcated part of the section of pipe E, as shown at fig. 2.

They have no connection with the passages for the supply of gas to the inner ring B, and enter the gas-chamber A in such manner that the gas flowing through them strikes against the sides of said chamber which are opposite their points of entry therein, almost at right angles.

This causes a deflection of the gas in all directions, and hence an equal diffusion of the same on both sides of the point at which it enters, and correlatively an equal pressure everywhere in said chamber, while at the same time avoiding the necessity of having the gas enter the same at more than two points, and thus doing away with the cross-pipes employed in my burner as patented.

The apertures G G' should be large enough to permit a little more gas to flow through them than can escape through the jets $a$ in order to pack the gas in the chamber C, and thus prevent the evil effects which would follow from a more rapid escape of the gas than it is supplied.

The inner ring B, of jets, is supplied with gas through an opening, H, which divides into two branch passages H' H", in order to enter the gas-chamber D at two points, as shown.

As in the case of the passages G G', in order to deflect the gas on both sides of its point of entry, and thus to diffuse it equally throughout the chamber D, the passages H' H" enter said chamber in such manner as to cause the gas flowing through them to strike against the interior surface of said chamber at such an angle as to produce that effect.

The combustion of gas issuing from the inner ring, in consequence of its being better ventilated, and for other reasons which it is not necessary to state, is far more rapid than that of the gas coming from the outer ring, and hence the flame from the inner ring ascends to a very much greater height than that from the outer ring, unless some provision be made to regulate the flow of gas to said inner ring.

The device employed by me for this purpose is a key, I, which, provided with a screw-thread, penetrates the opening H and reduces the size of the same to any desired extent, and thus enables me to control and regulate the flow of the gas through said opening or passage, and consequently to maintain the height of the flame from the inner ring of jets on the same level or plane with that from the outer ring.

What I claim is—

1. The combination of the duplicate concentric rings of jets A B, with gas-chambers C D, when the latter are connected with a bifurcated section of pipe E, and respectively supplied with gas through passages G G' and H' H", in the manner herein described, for the purpose set forth.

2. The combination of the regulating-key I with the inner ring of jets B, when said key is employed in connection with a passage, H, which above the key is divided into branch passages H' H", as described, for the purpose set forth.

A. E. DUPAS.

Witnesses:
H. N. JENKINS,
RUFUS R. RHODES.